July 5, 1966  F. W. WAHLIN  3,259,359
CAM OPERATED CONTROL VALVE
Filed June 17, 1963  2 Sheets-Sheet 1
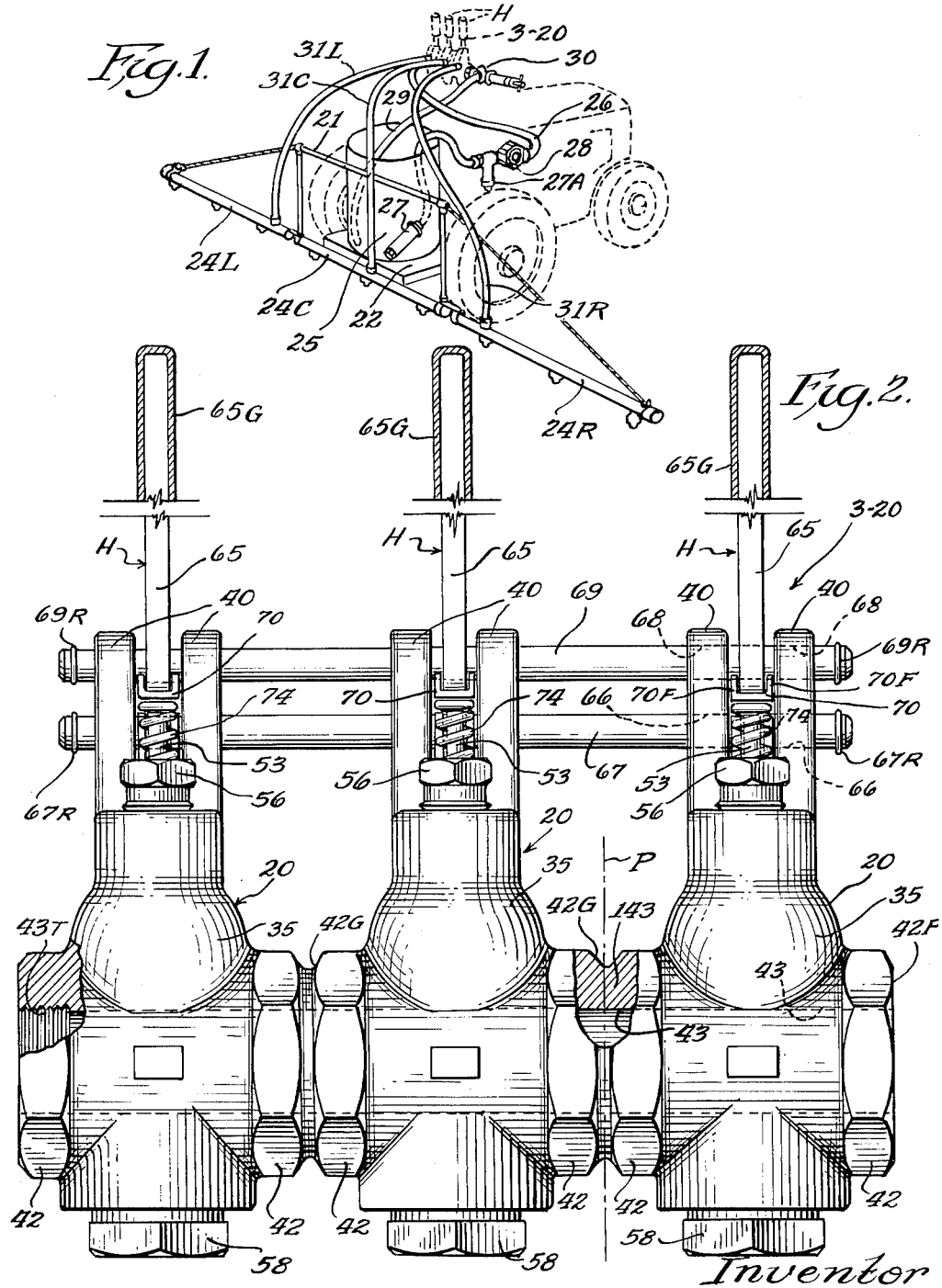
Inventor
Fred W. Wahlin
By Mann, Brown & McWilliams
Attys.

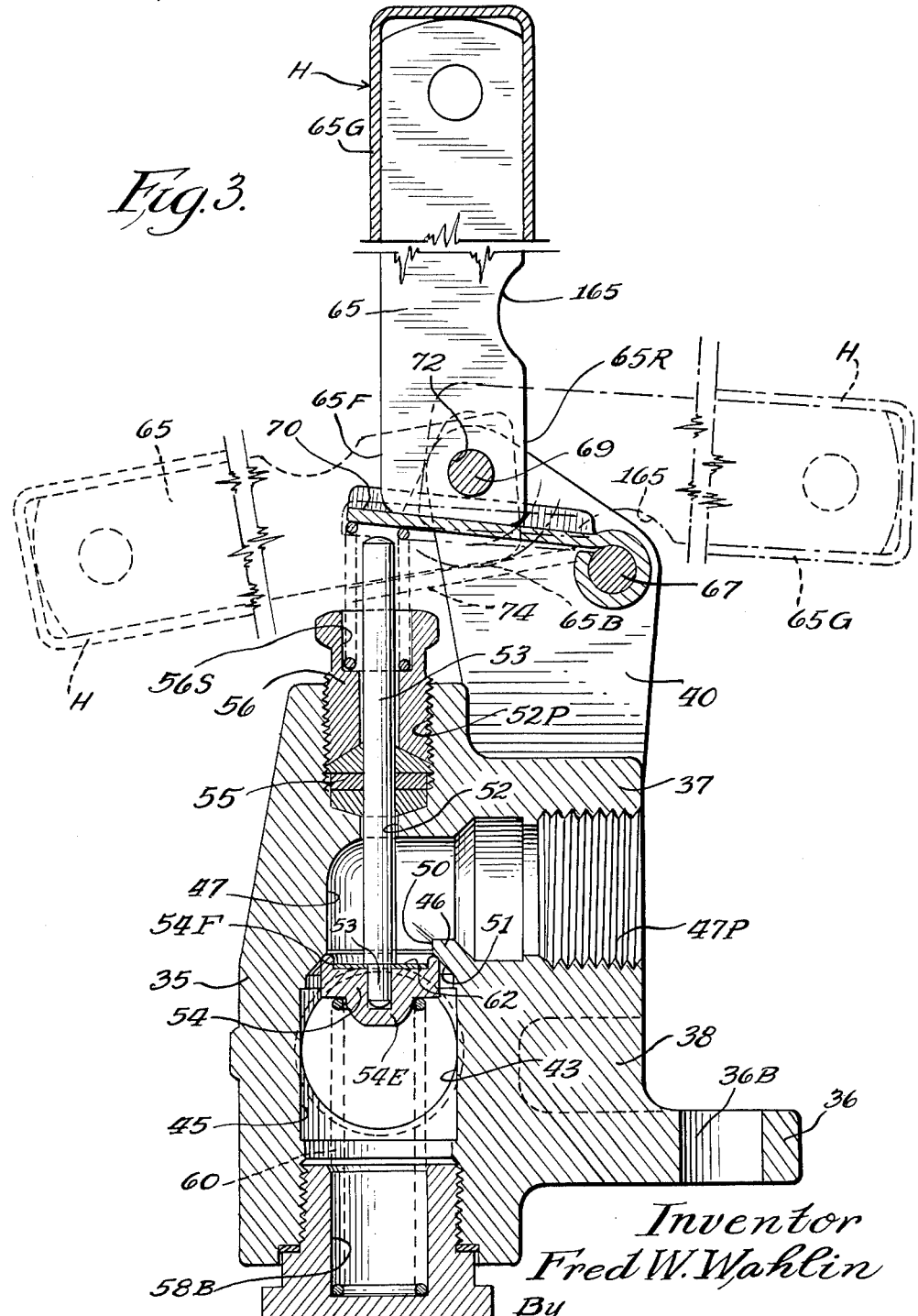

United States Patent Office 3,259,359
Patented July 5, 1966

3,259,359
CAM OPERATED CONTROL VALVE
Fred W. Wahlin, St. Charles, Ill., assignor to Spraying Systems Co., a corporation of Illinois
Filed June 17, 1963, Ser. No. 288,199
2 Claims. (Cl. 251—263)

This invention relates to control valves of the manually operable type for opening and closing liquid flow circuits.

One situation in which manual control valves of the aforesaid character are utilized is in agricultural spraying where the flow of spray solution must be turned off and on at various times during travel of the spray vehicle. In most such agricultural spraying apparatus two or three spray circuits are provided that discharge individually and selectively from either broadcast spray nozzles or from the separate spray sections of a boom spray. Various types of selective control valves have been employed for governing such spraying apparatus, but in general, such control valves have been considered to be overly complicated in structure and operation and have involved considerably cost both in original manufacture and in maintenance.

In view of the foregoing it is the primary object of this invention to provide an improved manually operable control valve for governing agricultural spraying circuits and the like, and another and related object is to enable this to be done in such a way that an improved valve of the aforesaid character may be economically manufactured and maintained, and which by reason of its novel form and arrangement lends itself to manufacture in multiple valve units or as single valves as may be required. More specifically, it is an object of this invention to provide an improved method of making manually operable control valves of the aforesaid character.

Another object of the invention is to provide a valve of the aforesaid character which simplifies the control of multiple circuit spraying equipment.

Other and further objects of the present invention will be apparent from the following description and claims, and are illustrated in the accompanying drawings, which, by way of illustration, show a preferred embodiment of the present invention and the principles thereof, and what is now considered to be the best mode in which to apply these principles. Other embodiments of the invention embodying the same or equivalent principles may be used and structural changes may be made as desired by those skilled in the art without departing from the invention.

In the drawings:

FIG. 1 is a schematic perspective view illustrating a multiple circuit spraying apparatus employing a valve unit of this invention;

FIG. 2 is a vertical front to rear cross sectional view through a valve embodying the invention; and FIG. 3 is a front elevational view of a multiple valve unit of this invention.

For purposes of disclosure the invention is herein illustrated as embodied in manually operated valve 20 that may be utilized individually or may be made up in multiple valve units such as the three-valve unit 3–20 shown in FIG. 1. The valve 20, in either its single or multiple form, is intended and adapted particularly for use as a control means for agricultural spraying equipment such as the three section boom sprayer shown schematically in FIG. 1 as being tractor-mounted. In the installation shown, a frame 21, mounted on a rear platform 23 of a tractor, has a central boom section 24C, and foldable right and left hand boom sections 24R and 24L to which spray solution is supplied selectively under control of triple-valve unit 3–20 that is mounted on the tractor in a position such that the tractor operator may selectively operate the three valves of the unit 3–20 by actuation of individual control handles H of such valves. The platform 23 carries a supply tank 25, and a supply line 26, including strainers 27 and 27A and a tractor operated pump 28, supplies spray liquid from the tank 25 to a valve inlet of the valve unit 3–20. A bypass line 29, including a pressure controlled bypass valve 30, serves to return excess spray liquid from the unit 3–20 to the tank 25, and individual hoses 31C, 31R and 31L connect the outlets of the valves 20 to the respective boom sections 24C, 24R and 24L.

Each valve 20 has a cast body 35 and under the present invention the body 35 has such a form and relationship that several such valve bodies 35 may be cast integrally in what may be termed a self-manifolding relation so as to simplify the production of multiple valve units such as the three-valve unit 3–20 while at the same time enabling the individual valve bodies 35 to be readily separated for use in making single valves 20 or multiple valve units having different numbers of valves 20.

Thus each valve body 35 is vertically elongated and has a rearwardly extending mounting lug 36 near its lower end and a rearwardly extending outlet boss 37 near its upper end, the outlet boss 37 and the lug 36 being connected by an integral vertical web 38, and the lug 36 extending rearwardly beyond the outlet boss 37 so that securing means may be extended through a mounting bore 36B in the lug. A pair of spaced mounting lugs 40 extend in spaced relation upwardly from the outlet boss 37, these lugs 40 being in front to rear planes and being used, as will be explained, in mounting the control handle H of the valve 20.

At its opposite sides and near its lower end each body 35 has a pair of projecting wrench flanges 42 that are cast integrally with the body in symmetrical, parallel relation, and these wrench flanges 42 have a horizontal passage 43 formed therethrough so as to intersect an inlet chamber 45. The passage 43 is located beneath a horizontal septum or cross wall 46 that divides the inlet chamber 45 from an outlet chamber 47 formed in the body 35 above the inlet chamber 45 and forwardly of the outlet boss 37. A rearwardly extending threaded outlet passage 47P is formed through the outlet boss 37 to the outlet chamber 47; a threaded bottom opening 45P is formed into the inlet chamber 45; and a port 50 is formed in the horizontal cross wall 46 with a downwardly facing valve seat 51 bordering the port 50. Aligned with the port 50 a small bore 52 is extended downwardly through the top wall of the body 35, and the bore 52 has a downward, threaded recess or counterbore 52P to serve as a packing recess about a valve actuating stem 53 that extends through the bore 52 and carries a valve member 54 at its lower end within the inlet chamber 45. Packing 55 surrounds the stem 53 and is compressed by a packing nut 56 threaded into the packing recess 52P.

The inlet and outlet chambers 45 and 47, as well as the passage 43, the outlet passage 47P, the bottom opening or passage 45P, the port 50 and the packing recess 52P are all formed by coring of the casting, and thus the required machining operation such as facing of the valve seat 51 and the wrench flanges 42, the formation of the bore 52, threading of the passage 43, 47P and 45P, the packing recess 52P may be economically performed.

A bottom cap 58, threaded into the threaded passage 45P at the lower end of the inlet chamber 45, has an upwardly opening and relatively deep spring receiving recess or bore 58B therein, and an expansive coil spring 60 seated in the bore 58B engages the valve member 54 to urge the same toward the valve seat. The valve member 54 is made from plastic with a central enlargement 54E on its lower face extending into the upper end of the spring 60 for maintaining the desired lateral relation of these parts. The upper face of the valve member 54 has an upwardly extending outer annular flange 54F that engages the valve seat, and within the flange 54E a recess is formed within which a metal stiffening washer 62 is positioned. The lower end of the valve stem 53 is reduced at 53R and extends through a complemental central opening in the washer 62 and into a blind central bore or cavity in the valve member 54. The washer 62 imparts strength to the plastic valve member 54.

The outlet chamber 47 is sealed by packing 55 and yet the valve stem 53 may be actuated downwardly to move the valve member 54 to open position when desired. The means for operating the valve stem 53 are carried by the upwardly projecting lugs 40 of the valve body 35 and include the operating handle H which is made from a flat metal bar 65 with a hand grip 65G on its upper end where the handle is normally grasped.

In mounting the bar 65, and providing for actuation of the valve stem 53 thereby, the lugs 40 have a first pair of aligned horizontal bores 66 formed therein near the rear edges of the lugs to receive a first pivot shaft 67, and a second pair of aligned horizontal bores 68 located upwardly and forwardly from the bores 66 to receive a second pivot shaft 69. After assembly the pivot shafts 67 and 69 are held in position by snap rings 67R and 69R that engage grooves in the shafts near their ends. A cam lever 70 has a curl 70C at its rear end through which the pivot shaft 67 extends, and the cam lever 70 extends forwardly beneath and in downwardly spaced relation to the shaft 69 and the forward end of the cam lever 70 is disposed over the upper end of the valve stem 53 so that by downward rocking movement of the cam lever 70 the valve member 54 may be moved to an open position. Such actuation of the cam lever 70 is accomplished by the handle H. Thus the bar 65 that forms the handle has a transverse bore 72 therethrough near its lower rear corner through which the pivot rod 69 extends so as to loosely pivot the handle H for shifting movement about the axis of the pivot rod 69. The handle H, however, is yieldingly held in any one of three different positions, and to accomplish this the cam lever 70 is yieldingly urged upwardly by an expansive coil spring 74 mounted in a spring seat 56S in the upper end of the packing nut 56 so as to surround the valve stem 53 and act upwardly against the forward end of the cam lever 70. The cam lever 70 is strengthened by upturned flanges 70F along its opposite edges. The lower end of the bar 65 fits between the flanges 70F so that the handle 65 is positioned laterally by the action of the flanges 70F which at their outer faces engage the adjacent surfaces of the lugs 40.

As above pointed out, the cam lever 70 acts yieldingly to hold the handle H in any one of three positions, and to accomplish this the bar 65 has parallel longitudinal front and rear edge surfaces 65F and 65R and a lower end surface 65B which in the present instance is displaced slightly from a right angular relation with respect to the edges 65F and 65R so that when the handle H is in its "valve closed" position the cam lever 70 will engage the surface 65B and will hold the handle H in such a position that it extends upwardly in a parallel relation to the valve stem 53. The handle H may also be moved to a rearwardly extending "out of the way" position wherein the valve is closed, and in this position a clearance recess 165 in the rear edge of the handle is located over the curl 70C, and the cam lever 70 yieldingly engages the edge surface 65R so as to hold the handle H in the position to which it has been set. The lower corners of the bar 65 are rounded to provide cam surfaces that engage the lever 70 as required to actuate the same.

In its third or "valve open" position the handle H extends forwardly and the cam lever 70 engages the surface 65F to hold the handle H in place, and because of the relationship or spacing of the surface 65F from the axis of the pivot shaft 69, the cam lever 70 is pivoted downwardly so as to shift the valve member 54 to its open position.

It was originally noted that the opening or bore 72 in the bar 65 was near the lower rear corner thereof, and thus by spacing the bore 72 the same distance from the edges 65R and 65B, two valve closed positions are provided for the handle H, and a substantially greater spacing between the bore 72 and the edge 65F provides for substantial downward actuation of the cam lever 70 which opens the valve when the handle H is moved to its forward or "valve open" position. Such "three-position" capabilities of the handle H are of particular importance in the use of multiple-valve units such as the unit 3–20, as will be described.

The valve bodies 35 are cast in multiple, as hereinabove noted, and in such multiple casting the valve bodies are disposed in side by side relation as shown in FIG. 2 with the wrench flanges 42 aligned on a common axis and with adjacent wrench flanges 42 of adjacent bodies 35 integrally connected by relatively thick annular webs 142. Thus, one or more valve bodies 35 may be cut from the group along a plane P located between the adjacent wrench flanges 42, and the exposed end surfaces of the wrench flanges may then be faced at 42F, and the ends of the passage 43 threaded as at 43T, at the time when the other machining operations above described are performed. The plane P in which the casting is to be divided is defined by an annular groove 42G between adjacent wrench flanges 42. When several valve bodies 35 are to be made up as a multiple valve unit such as the valve unit 3–20, the cored passage 43 extends through all of the valve bodies of such unit and, in effect, serves as a manifold to the opposite ends of which the inlet and bypass lines 26 and 29 may be connected. When a single or separate valve 20 is to be made, the opposite ends of the passage 43 thereof are threaded for connection with inlet and bypass lines as above described.

In the use of a multiple valve unit in agricultural spraying, most of the valve opening and valve closing movements of the operator must be performed at the time when the tractor is being turned around at the end of the field. At this time the operator must give most of his attention to the steering of the tractor so that ease of operation and simplicity of selection of the valves is particularly important. With the present structure this is accomplished since valve 20 of a multiple unit that is not to be operated may have its handle H placed in the "out of the way" position so as to avoid inadvertent opening thereof.

From the foregoing description it will be evident that the present invention provides a new and improved manually operable valve structure that is particularly adapted for use in agricultural spraying systems and which is of such a character that production thereof in multiple valve units is facilitated and is accomplished in such a way that the several valves of such a unit are in effect self-manifolding.

Thus while a preferred embodiment of the invention has been illustrated herein, it is to be understood that changes and variations may be made by those skilled in the art without departing from the spirit and scope of the appended claims.

I claim:

1. A manual valve including a valve body having inlet and outlet chambers separated by a cross wall, said cross wall having a valve port therein, a valve member disposed in one of said chambers, and supported for reciprocal opening and closing movement with respect to said valve port, said valve member including an elongated valve stem disposed axially of said port, said stem being mounted in bearing relation with respect to said valve body, and having the free end thereof extending through said body, a spring biasing said valve member to a normally closed position, means for selectively actuating said valve member to its open position comprising an operating handle pivotally mounted to said body, and a cam lever disposed intermediate said operating handle and the free end of said valve stem, said cam lever being pivotally supported at an end thereof remote from said valve stem and the other end of said cam lever being disposed opposite said valve stem and in position for selective engagement therewith, spring means biasing said cam lever into a position normally spaced from the end of said valve stem and in constant contact with said handle, said handle having three cam surfaces formed thereon, and being pivotable about said axis into distinct positions to selectively engage one of said cam surfaces with said cam lever, two of said cam surfaces being spaced from said axis such that movement of said handle to bring said surfaces into engagement with said cam lever permits said valve to remain in its normally closed position, the third said cam surface being disposed at a greater distance from said axis so that movement of said operating handle to bring said third said cam surface into engagement with said cam lever causes said cam lever to bear against said valve stem for opening said valve member.

2. The valve arrangement as set forth in claim 1 wherein the two of said cam surfaces are equally spaced from the pivot axis of said operating handle, and are adjacent to one another, and located at the end and one side respectively of said operating handle.

References Cited by the Examiner
UNITED STATES PATENTS

| | | | |
|---|---|---|---|
| 456,546 | 7/1891 | Blankerts | 137—608 |
| 869,755 | 10/1907 | Tretch | 137—608 X |
| 1,695,848 | 12/1928 | Higgins | 251—263 |
| 1,707,040 | 3/1929 | Belknap | 74—107 |
| 1,860,445 | 5/1932 | Andersson | 251—263 X |
| 1,883,843 | 10/1932 | Woodford | 251—263 X |
| 2,368,212 | 1/1945 | Grant | 251—263 X |
| 2,484,628 | 10/1949 | Valley | 251—263 X |
| 2,543,205 | 2/1951 | Shoffner | 251—263 X |
| 2,646,248 | 7/1953 | Cornelius | 251—263 |
| 2,669,011 | 2/1954 | Brumbaugh | 29—157.1 |
| 2,869,221 | 1/1959 | Siepmann | 29—157.1 |

ISADOR WEIL, *Primary Examiner.*

ALAN COHAN, *Examiner.*